United States Patent
Ta et al.

(10) Patent No.: US 7,574,294 B2
(45) Date of Patent: Aug. 11, 2009

(54) CONTROLLER FOR ELECTRIC POWER STEERING DEVICE

(75) Inventors: CaoMinh Ta, Gunma (JP); ChunHao Jiang, Gunma (JP); Shuji Endo, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 504 days.

(21) Appl. No.: 10/558,824

(22) PCT Filed: May 14, 2004

(86) PCT No.: PCT/JP2004/006883

§ 371 (c)(1),
(2), (4) Date: Nov. 29, 2005

(87) PCT Pub. No.: WO2004/106143

PCT Pub. Date: Dec. 9, 2004

(65) Prior Publication Data

US 2007/0007072 A1  Jan. 11, 2007

(30) Foreign Application Priority Data

May 30, 2003 (JP) ............... 2003-153747
Jun. 9, 2003 (JP) ............... 2003-163446

(51) Int. Cl.
*B62D 6/00* (2006.01)
*B62D 5/04* (2006.01)
(52) U.S. Cl. ............... 701/41; 701/42; 701/72; 180/234; 318/432
(58) Field of Classification Search ............ 701/41–43, 701/72; 180/6.2, 6.24, 234; 318/432
See application file for complete search history.

(56) References Cited

U.S. PATENT DOCUMENTS

| | | | |
|---|---|---|---|
| 5,701,066 A | 12/1997 | Matsuura et al. | |
| 6,122,579 A * | 9/2000 | Collier-Hallman et al. | .... 701/41 |
| 6,380,706 B1 * | 4/2002 | Kifuku et al. | ............ 318/434 |
| 6,690,135 B2 * | 2/2004 | Mir et al. | ............ 318/599 |
| 6,711,484 B2 | 3/2004 | Kifuku et al. | |
| 2001/0005121 A1* | 6/2001 | Sakamaki | ............ 318/727 |
| 2004/0007999 A1* | 1/2004 | Kushion et al. | ............ 318/442 |

FOREIGN PATENT DOCUMENTS

| | | |
|---|---|---|
| EP | 0900710 A2 | 3/1999 |
| EP | 1093992 A2 | 4/2001 |
| JP | 4-299085 A | 10/1992 |
| JP | 6-211142 A | 8/1994 |
| JP | 6-253569 A | 9/1994 |

(Continued)

*Primary Examiner*—Tan Q Nguyen
(74) *Attorney, Agent, or Firm*—Sughrue Mion, PLLC

(57) ABSTRACT

A control apparatus of an electric power steering apparatus is provided in which a nonlinear element of a motor model of the electric power steering apparatus is compensated beforehand to linearize the motor model and the back electromotive force of the motor is computed to compensate the back electromotive force for a control loop, and conduct back electromotive force compensation with no lag in order to realize a control apparatus of an electric power steering apparatus with less control error, stable controllability, small motor output torque ripple, good wheel steering feeling, and less motor noise.

11 Claims, 14 Drawing Sheets

FOREIGN PATENT DOCUMENTS

| | | |
|---|---|---|
| JP | 7-81606 A | 3/1995 |
| JP | 8-20350 A | 1/1996 |
| JP | 11-147479 A | 6/1999 |
| JP | 2949183 B2 | 7/1999 |
| JP | 2000-103349 A | 4/2000 |
| JP | 2001-315657 A | 11/2001 |
| JP | 2002-249061 A | 9/2002 |
| JP | 2002-249061 A1 | 9/2002 |
| JP | 2003 118610 A | 4/2003 |
| JP | 2003-137110 A | 5/2003 |
| WO | WO 01/77812 A1 | 10/2001 |

* cited by examiner

CONTROLLER FOR ELECTRIC POWER STEERING DEVICE

TECHNICAL FIELD

The present invention relates to a control apparatus of an electric power steering apparatus in which steering auxiliary power by a motor is given to a steering system of automobiles and vehicles, and to a control apparatus of an electric power steering apparatus in which nonlinear elements of a motor which are the targets for control are separated from linear element to allow control with less error.

BACKGROUND ART

An electric power steering apparatus which energizes a steering apparatus of automobiles and vehicles in auxiliary power by motor torque energizes a steering shaft or a rack shaft with motor driving force in auxiliary power by a transmission mechanism such as a gear or a belt through a reduction gear. Such a conventional electric power steering apparatus is devised variously on control in a control apparatus of the electric power steering apparatus which energizes a steering apparatus by assist torque (steering auxiliary torque) so that a driver can smoothly conduct steering under any situations such as in high or low speed drive, or in running straight or at a curve, or in parking.

First, before introducing examples of specific conventional control methods, control over the electric power steering apparatus will be described in general. When the relationship between voltage and current of a motor, which are main control targets of the electric power steering apparatus, is expressed in an equation, it can be expressed by Equation (1).

$$V = EMF + (R + s \cdot L) \cdot I \quad (1)$$

Here, V is motor terminal voltage, EMF is motor back electromotive force, I is motor winding current, R is a motor winding resistance, and L is a motor winding inductance. S is a Laplace variable, which expresses d/dt. In addition, EMF is expressed by the following Equation (2).

$$EMF = Ke \cdot \omega \quad (2)$$

Here, Ke is a back electromotive force constant, and $\omega$ is rotor angular velocity.

$(R+s \cdot L) \cdot I$, which is the second term of Equation (1), is an electric element and has linearity. However, EMF of the first term is generated by the motor angular velocity $\omega$, and greatly affected by nonlinear elements such as external forces from tires, and inertia and friction of mechanical elements of the electric power steering apparatus. Generally, the nonlinear element is hard to be controlled.

Here, feedback control (hereinafter, it is denoted as FB control), which is a typical control method, will be described briefly. Generally, FB control is that a target value, which is a certain control target, is controlled so as to match with a certain reference value. Typically, the difference between the target value and the reference value is inputted to a proportional integral circuit (hereinafter, it is denoted as a PI circuit), for example, for control. Then, the input of the PI circuit is a signal which includes all the mixed influences of variation of the reference value, disturbance and noise to the target value, fluctuations in parameters, and the like. Regardless how and which element among them exerts influence upon the control, it is such a quite simple control that whether the output matches with the reference value is determined and when there is no matching between them correction operation is conducted. Therefore, this pure FB control performs the correction operation only when an error exists so that the output is varied unstably near the reference value, which appears as a torque ripple of motor output in the electric power steering apparatus. A great torque ripple causes a problem that a driver feels uncomfortable in steering or with increased motor noise.

Here, there is an apparatus described in JP-A-2002-249061 as an example of the control apparatus using FB control (hereinafter, Patent Reference 1). The description will be described with reference to FIG. 5. Based on inputted car speed and steering torque, a current command value $I_{ref}$ is computed in a target current deciding section 120. More specifically, a steering torque detector 101 connected to a torque sensor, not shown, detects steering torque, a phase compensator 108 compensates a phase lag, and then its output is inputted to a steering torque controller 102. Furthermore, a car speed signal detected by a car speed detector 114 is inputted to the steering torque controller 102, and based on the both inputs, a torque value that assists steering torque generated by manipulation of a steering wheel by a driver is determined. Then, the torque value to be assisted is inputted to a motor current decider 107 to decide target current $I_{ref}$.

Subsequently, actual current $I_{act}$ of the output of a motor actuator 109 is detected by a motor current detector 111 and is fed back to a subtraction circuit 113 to which the target current $I_{ref}$ is inputted. Error between the target current $I_{ref}$ and the actual current $I_{act}$ is computed, and it is inputted to a first current controller 103. Basically, output $V_{dFB}$ of the first current controller 103 drives the motor actuator 109 to control a motor 110. However, an auxiliary signal and an auxiliary control loop, described below, are added in order to smoothly conduct steering. First, as the auxiliary signal, disturbance voltage $V_{dist1}$ and disturbance voltage $V_{dist2}$, and back electromotive force $V_b$ are compensated. Moreover, a disturbance voltage estimation observer 115 observes whether the motor actuator 109 makes output according to $V_{ref}$ that is a command value. The total disturbance voltage is $(V_{dist1}+V_{sist2}+V_b)$, but the back electromotive force $V_b$ is proportional to the steering speed, about 3 Hz at the maximum, whereas the disturbance voltage caused by brush vibrations and commutation ripples is 20 to 200 Hz. Thus, a highpass filter 116 is used to remove the back electromotive force $V_b$, and to extract only the disturbance voltage $V_{dist}$. The extracted disturbance voltage $V_{dist}$ is inputted to a second current controller 105, and its output is added to $V_{dFB}$ by an adding circuit 112a, to compute motor drive command voltage $V_{ref}$. The motor drive command voltage $V_{ref}$ is different from $V_{ref}$, a basic control described above; it is a motor drive command voltage $V_{ref}$ that is corrected including the disturbance voltage which, compared with the basic control, enables to cope with various steering situations described above so as to smoothly manipulate the steering wheel. Accordingly, when the control apparatus in the configuration like this attempts to meet various steering situations, complicated control elements such as the highpass filter 116 and the second current controller 105 need to be added, resulting in a complicated control circuit.

Furthermore, Japanese Patent No. 2949183 (hereinafter, it is called Patent Reference 2) discloses an example of the conventional control apparatus of the electric power steering apparatus which compensates the back electromotive force described above. It will be described with reference to FIG. 14. In the drawing, control is carried out so that command value $I_r$ computed in a torque sensor 100 mounted on the electric power steering apparatus is inputted to a control circuit 101, and a PWM control circuit 12 controls an inverter circuit 13 based on the command of the control circuit 101 to drive a motor 14. In the control circuit 101, motor current $I_f$ detected by a current detection circuit 15 is fed back, error between the command value $I_r$ and the motor current $I_f$ is calculated, and the error is inputted to a PI circuit to compute the command value $V_d$. In the basic control method, the command value $V_d$ is split into three phases (a-phase, b-phase, and c-phase) to be command values for the PWM control circuit 12.

Moreover, in the control circuit 101, ω is determined from revolutions N detected by a rotational speed sensor 102 mounted on the motor 14, back electromotive force E is detected from Equation (2), the back electromotive force E is added to the command value $V_d$ to compute a new command value $V_m$, and the motor 14 is controlled based on the $V_m$. The compensation of the back electromotive force E allows smoother steering than the basic control method.

However, in the case of the scheme in which the motor revolutions are detected by using an encoder to compute the back electromotive force as shown in Patent Reference 2, the operation period of revolutions is set longer than the current control period in order to increase the resolution of revolutions to accurately compute the back electromotive force even in low-speed rotation. This becomes a factor to increase a lag in high-speed rotation. When the back electromotive force is small and the effect of the back electromotive force compensation is small as in low-speed rotation, the lag problem has small influence upon the back electromotive force compensation, but the lag causes a problem that the effect of the back electromotive force compensation is reduced when the back electromotive force is great as in high-speed rotation. More specifically, in high speed rotation, the back electromotive force compensation without delay is desirable.

The invention has been made in view of the circumstances. The invention relates to a control apparatus of an electric power steering apparatus. A first object of the invention is to compensate a nonlinear element of a motor of the electric power steering apparatus beforehand to linearize the motor. Furthermore, a second object is to conduct back electromotive force compensation with no lag by a control apparatus in which the back electromotive force of a motor is computed to compensate the back electromotive force for a control loop. By achieving the objects, a control apparatus of an electric power steering apparatus with less control error, stable controllability, small motor output torque ripple, a good steering feeling, and less motor noise is provided.

DISCLOSURE OF THE INVENTION

The invention relates to a control apparatus of an electric power steering apparatus in which steering auxiliary power by a motor is given to a steering system of a vehicle, the first object of the invention is achieved by including:

a motor drive circuit which drives the motor;

a current control circuit (11) which computes a first voltage command value that is a control command to the motor drive circuit;

a back electromotive force computation circuit (17) which computes a back electromotive force value of the motor based on Output voltage and output current of the motor drive circuit; and an adding circuit (18) which adds the back electromotive force to the first voltage command value and computes a second voltage command value that is a new control command to the motor drive circuit.

Furthermore, the first object is effectively achieved in a manner in which:

a second adding circuit (23) is disposed between the current control circuit (11) and the adding circuit (18);

output of the current control circuit (11) is input to the second adding circuit (23), and output of the second adding circuit (23) is input to the adding circuit (18);

a disturbance observer circuit (19) is disposed which has output of the second adding circuit (23) and the output of the motor drive circuit as input; and a disturbance value which is output of the disturbance observer circuit (19) is inputted to the second adding circuit (23), added to the first voltage command value, and inputted to the adding circuit (18).

Moreover, the first object is effectively achieved in a manner in which:

the disturbance value is a difference between a value obtained by multiplying the input value of the adding circuit (18) by a transfer function and a value obtained by multiplying an output value of the motor drive circuit is multiplied by the transfer function. Besides, the first object is effectively achieved in a case that:

the current control circuit (11) is a feed forward control or feedback control.

Furthermore, the second object of the invention is effectively achieved by including:

a motor drive circuit which drives a motor;

a first back electromotive force computation circuit which computes back electromotive force (EMF1) of the motor based on the output voltage and output current of the motor drive circuit;

a phase computation circuit which computes an electrical angle (θ) and an angular velocity (ω) based on the back electromotive force (EMF1);

an adjustment circuit which computes an adjusted electrical angle (θ+Δθ) where a phase lag (Δθ) is compensated by the angular velocity (ω); and a second back electromotive force computation circuit which computes an adjusted back electromotive force (EMF2) based on the adjusted electrical angle (θ+Δθ).

Moreover, the second object of the invention is more effectively achieved in a manner in which:

a current control circuit which computes a command value ($V_{ref}$) to drive-control the motor based on a steering torque command value ($T_{ref}$) to the motor, wherein the motor is controlled based on a command value ($V_{ref}$+EMF2) where the adjusted back electromotive force (EMF2) is added to the command value ($V_{ref}$).

Besides, the second object of the invention is achieved by including:

a current control circuit which computes a command value ($V_{ref}$) to drive control the motor based on a steering torque command value ($T_{ref}$) to the motor;

a motor drive circuit which drives the motor;

a first back electromotive force computation circuit which computes back electromotive force (EMF1) of the motor based on the output voltage and output current of the motor drive circuit; and a correction circuit which computes a corrected back electromotive force (K·EMF1) where the back electromotive force (EMF1) is multiplied by a set value (K), wherein the motor is drive-controlled based on a value ($V_{ref}$+K·EMF1) where the command value ($V_{ref}$) is added to the corrected back electromotive force (K·EMF1). Furthermore, the second object is achieved in a case that:

the current control circuit is a feed forward control circuit or a feedback control circuit.

BEST MODE FOR CARRYING OUT THE INVENTION

First, a theoretical basis of the invention is shown, and then embodiments will be described.

A point of the invention to achieve the first object of the invention is to separate nonlinear elements from a motor, which is a control target, to linearize the motor. The nonlinear elements of the motor, are roughly categorized into two elements: a motor back electromotive force and other nonlinear elements such as noise. Then, since the back electromotive force, which is a state variable that may influence upon output, can be computed beforehand, it is computed by a scheme described later. Then, for the nonlinear elements of the other category, an observer (state observer), described later, can be used when a state variable that is considered to have influence upon output is unknown beforehand or when the influence of disturbance and noise is removed. Thus, the observer is used to extract the nonlinear elements of the other category.

Figure 1:
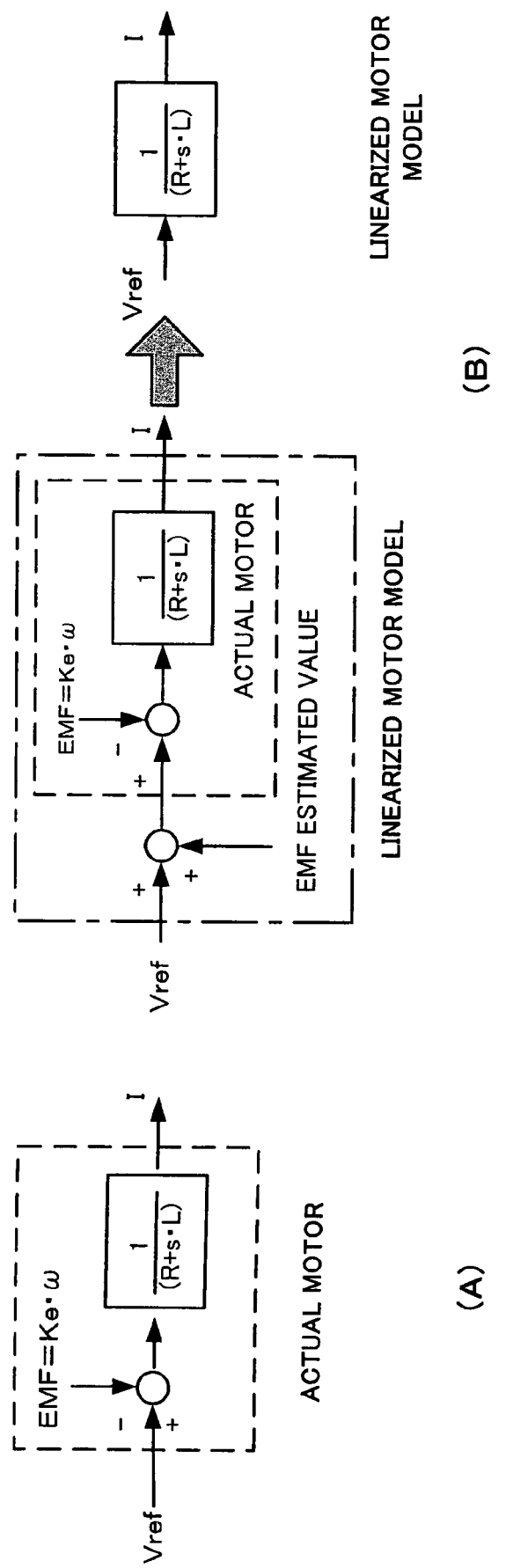
FIG. 1 is explanatory diagrams illustrative of linearization of a motor.

First, a first aspect of the invention that achieves the first object of the invention, in which the back electromotive force is compensated to linearize the motor, will be theoretically described with reference to FIG. 1.

FIG. 1(A) is a diagram illustrating an actual motor. It corresponds to Equations (1) and (2) described above when expressed by equations. Then, as the back electromotive force EMF=Ke·ω is a nonlinear element as described in Equations (1) and (2), the motor model in FIG. 1(A) is a nonlinear element. To linearize this motor model, as shown in FIG. 1(B), the EMF estimation value (computed value) is estimated, and is added to the voltage command value $V_{ref}$. Then, the influence of the back electromotive force EMF of the actual motor can be canceled, and the motor model can be linearized as $1/(R+s \cdot L)$.

Next, a specific scheme to estimate (compute) the back electromotive force will be described below. When the motor is expressed by an equation, it is as shown in Equation (1). When this is modified to calculate the back electromotive force EMF, it is expressed as the following Equation (3):

$$EMF = V - (R + s \cdot L) \cdot I \qquad (3)$$

where, V is motor voltage, I is motor current, EMF is the motor back electromotive force, R is a motor resistance value, L is a motor inductance value, and s is a Laplace variable.

When the back electromotive force EMF is fully compensated, Equation (3) can be expressed as Equation (4):

$$I/V = 1/(Rn + s \cdot Ln) = Pn \qquad (4)$$

where, Rn is a nominal motor resistance, Ln is a nominal motor inductance, and Pn is a nominal motor model.

For a property of Equation (4), Equation (4) is a linear equation. When Equation (4) is modified as follows, $$V = I \cdot (Rn + s \cdot Ln) = I \cdot Pn^{-1} \qquad (5)$$

it is written as a control target:

$$V_{ref} = I_{ref}(Rn + s \cdot Ln) = I_{ref} \cdot Pn^{-1} \qquad (6)$$

Therefore, the current command value $I_{ref}$ is inputted to directly compute a first voltage command value $V_{ref}$.

In consideration of a practical problem that noise overlaps with an input signal, it need to be passed through a lowpass filter (hereinafter, it is denoted as LPF) of the first order lag. That is:

$$V_{ref} = I_{ref} \cdot (Rn + s \cdot \text{Ln}) / (1 + s \cdot T) \qquad (7)$$

$$= I_{ref} \cdot Pn^{-1} / (1 + s \cdot T)$$

where, T=1/2πfc, T is a time constant of LPF, and fc is a cutoff frequency.

Thus, Equation (7) is a basic transfer function for FF control. However, since Equation (7) is obtained by modeling only the motor resistance and the inductance, which are motor electric properties, the conditions to make at Equation (7) held in actual motor control are:

(i) The back electromotive force is fully compensated;
(ii) The motor model is correct; and
(iii) There is no imperfect element in the system model such as detection error or analog-digital conversion noise.

Figure 5:
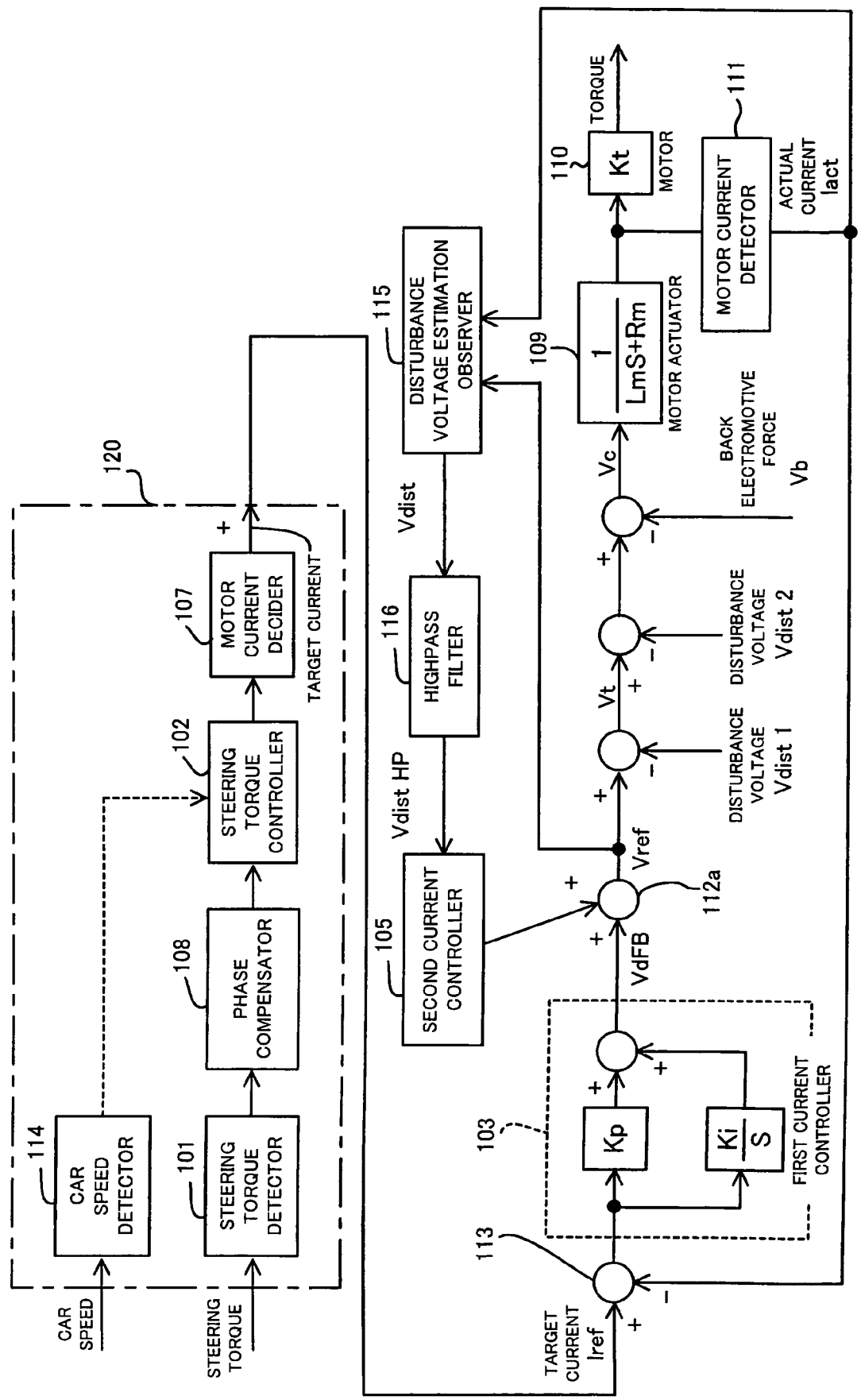
FIG. 5 is a control block diagram illustrating an electric power steering apparatus to which conventional feedback control is applied.

Then, conventionally, FF control which is designed under condition (i), (ii) and (iii) has big control error because of mixed linear elements and nonlinear elements. Furthermore, even though the disturbance voltage estimation observer 115 shown in FIG. 5, which has been referred in explanation of the conventional FB control, is used for FF control to compensate all of (i), (ii) and (i) by the disturbance observer, the value of the-back electromotive force exceeds the range that can be compensated by the disturbance observer. Therefore, it cannot be compensated enough to result in remaining a considerable amount of control error.

As for (i), the invention directly adds a compensation loop for the back electromotive force to a basic control loop for solution, not by the disturbance observer. It is difficult for fully, perfectly modeling (ii) due to temperature variation in the motor, for example. Moreover, since (iii) includes the nonlinear elements such as detection error and analog-digital conversion, (iii) is also difficult for perfectly correct modeling. Accordingly, the disturbance observer is applied to (ii) and (iii) for compensation.

Described above is the explanation for the theoretical basis of the invention.

Figure 2:
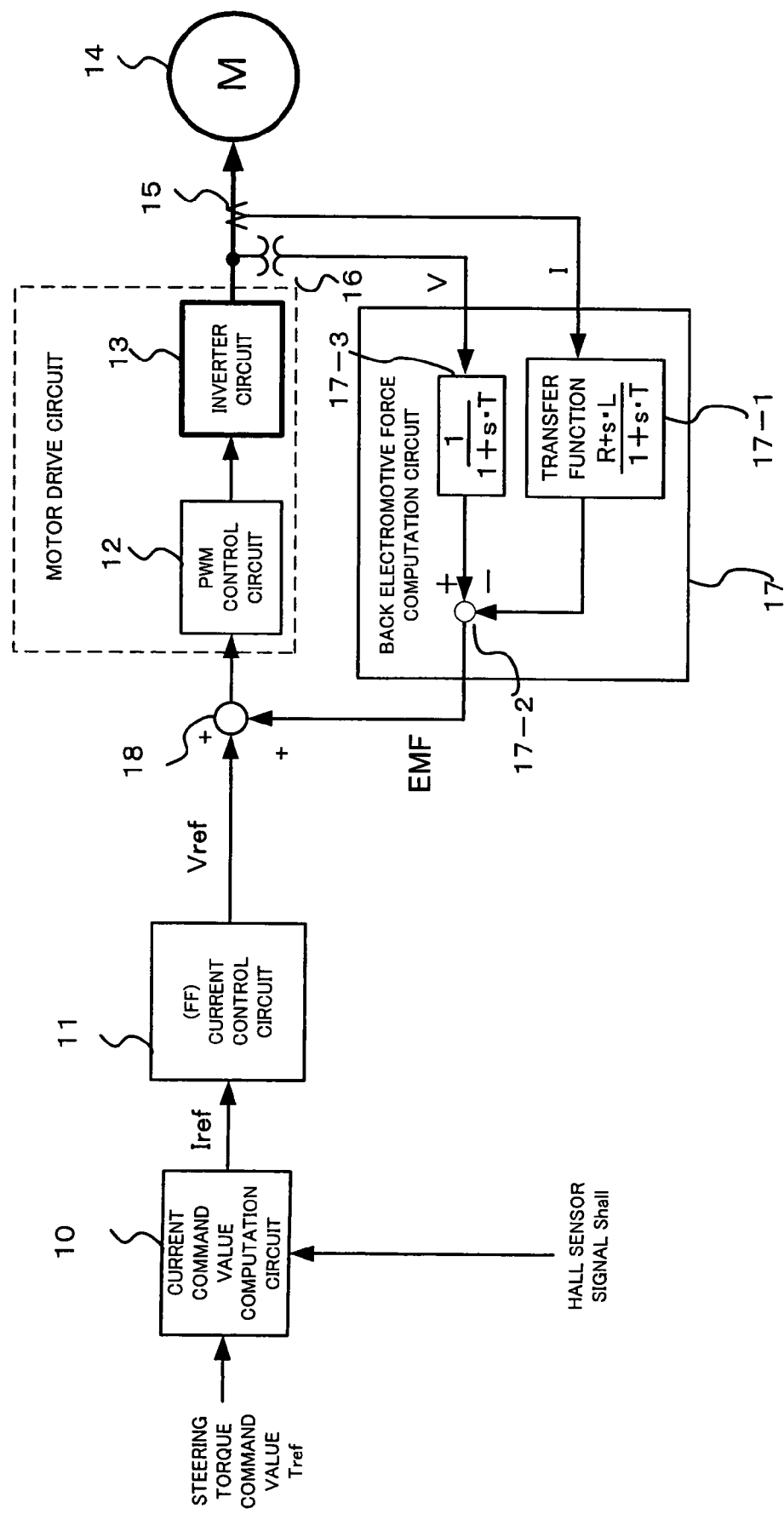
FIG. 2 is a control block diagram illustrating an electric power steering apparatus in which a first aspect of the invention is applied to a feed forward control.

An embodiment of FF control where the back electromotive force is compensated as the first aspect of the invention will be described in detail with reference to FIG. 2.

First, the circuit configuration of the basic control for the motor will be described. The torque command value $T_{ref}$ and the Hall sensor signal $S_{hall}$ are inputted to a current command value circuit 10 to compute the current command value $I_{ref}$, and input it to a subsequent feed forward current control circuit 11. For the feed forward current control circuit, a first order lag circuit with a small time constant, for example is used. A first voltage command value $V_{ref}$, which is the output of the current control circuit 11, is inputted to a motor drive circuit which drive controls a motor 14 through an adding circuit 18. Here, the motor drive circuit is formed of a series circuit of a PWM control circuit 12 and an inverter circuit 13. Note that, the circuit configuration of conventional FF control is in which the voltage command value $V_{ref}$ is directly inputted to the motor drive circuit without adding a back electromotive force EMF, described later, thereto, by the adding circuit 18. More specifically, in the conventional FF control, all the elements, not only $(R+s \cdot L) \cdot I$ that is the linear element of the motor model expressed by Equation (1), but also the nonlinear element such as the back electromotive force EMF being, or noise are to be controlled by the voltage command value $V_{ref}$. Thus, it is of the circuit configuration where control error is likely to be generated.

Then, for the point of the invention, it is important to form the configuration in which each of the nonlinear elements is separated and extracted, that is, the elements that may have influence upon output are extracted and compensated beforehand and then the motor model is linearized for control. The nonlinear elements are divided into the motor back electromotive force EMF with great influence and the remaining nonlinear elements including noise and the others to be calculated respectively.

First, in order to compute the back electromotive force EMF, a current detection circuit 15 detects the motor current I, a voltage detection circuit 16 detects the motor voltage V, and the voltage V and the current I are inputted to a back electromotive force computation circuit 17 to compute the back electromotive force EMF of the motor 14. More specifically, the back electromotive force EMF is computed by a scheme expressed by Equation (3). Therefore, in the back electromotive force computation circuit 17, a transfer function circuit 17-1 to which the detected motor current I is input is disposed, and a subtraction circuit 17-2 which computes difference between the output of the transfer function circuit 17-1 and the motor voltage V passed through an LPF circuit 17-3 is disposed, and the output of the subtraction circuit 17-2 is the back electromotive force EMF determined. Here, the specific function of the transfer function circuit 17-1 is $(R+s \cdot L)/(1+s \cdot T)$ expressed by Equation (7). In addition, the denominator $(1+s \cdot T)$ of the transfer function circuit 17-1 expresses the first order lag circuit of LPF to remove noise contained in the detected motor current I. Then, it is configured so that the computed back electromotive force EMF is fed back to the adding circuit 18, and the back electromotive force EMF is added to the first voltage command value $V_{ref}$ which is the output of the current control circuit 11 of the conventional FF control circuit to compute a new, second voltage command value ($V_{ref}$+EMF).

With the circuit configuration described above, the input of the motor drive circuit is the second voltage command value ($V_{ref}$+EMF), the output of the adding circuit 18, not the first voltage command value $V_{ref}$, the conventional voltage command value. The motor drive circuit is formed of a series circuit of the PWM control circuit 12 and the inverter circuit 13, and the voltage command value ($V_{ref}$+EMF) is to express the PWM duty ratio of the PWM control circuit 12. The output current of the inverter circuit 13 PWM controlled by the PWM control circuit 12 drives the motor 14 to generate torque.

The operation of the embodiment will be described based on the configuration of the embodiment.

First, the current command value $I_{ref}$ is computed in the current command value circuit 10 based on the torque command value $T_{ref}$ and the Hall sensor signal. The first order lag transfer function, for example is applied to the current control circuit 11 that is an FF control having the current command value $I_{ref}$ as input, which is based on the theory of Equation (7). For the time constant and gain of the first order lag transfer function, optimum values in the system may be selected by experiments. Conventionally, since the first voltage command value $V_{ref}$, the output of the current control circuit 11, is directly inputted to the PWM control circuit 12, it results in greatly remaining control error because of mixed the linear elements and the nonlinear elements.

The invention is to compensate the back electromotive force EMF beforehand, which is the nonlinear element having great influence upon output of the voltage command value $V_{ref}$, for linearizing the control. In other words, the back electromotive force compensation that is the condition (i), which is one of the conditions to fully hold Equation (6) is added.

Back electromotive force compensation is computed based on the equation expressed by Equation (3). That is, based on the motor voltage V detected by the voltage detection circuit 16 and the motor current I detected by the current detection circuit 15 as input, the back electromotive force EMF is computed by the back electromotive force detection circuit 17. More specifically, the detected motor current I is inputted to the transfer function circuit 17-1, difference between the $(R+s \cdot L) \cdot I/(1+s \cdot T)$ which is the output of the transfer function circuit 17-1 and the detected motor voltage V is conducted by the subtraction circuit 17-2, the output of the subtraction circuit 17-2, that is, the output of the back electromotive force computation circuit 17 is the back electromotive force EMF determined. In addition, the denominator $(1+s \cdot T)$ of the transfer function circuit 17-1 is intended to do noise removal out of the motor current I by the LPF circuit, the first order lag function.

Subsequently, for the point of the invention, the back electromotive force EMF which is the output of the back electromotive force computation circuit 17 is added to the voltage command value $V_{ref}$ which is the output of the current control circuit 11 by the adding circuit 18, and a new second voltage command value ($V_{ref}$+EMF) is computed. Then, to the PWM control circuit 12 of the motor drive circuit, not the conventional first voltage command value $V_{ref}$, but the new second voltage command value ($V_{ref}$+EMF) which is the compensated back electromotive force is inputted, and the inverter circuit 13 drives the motor 14 based on the command of the PWM control circuit 12.

Consequently, since the motor 14 is controlled in the state that the back electromotive force EMF which is the nonlinear element is compensated beforehand by the second voltage command value ($V_{ref}$+EMF), there is an advantage that an electric power steering apparatus with less control error and small torque ripple can be achieved.

Figure 3:
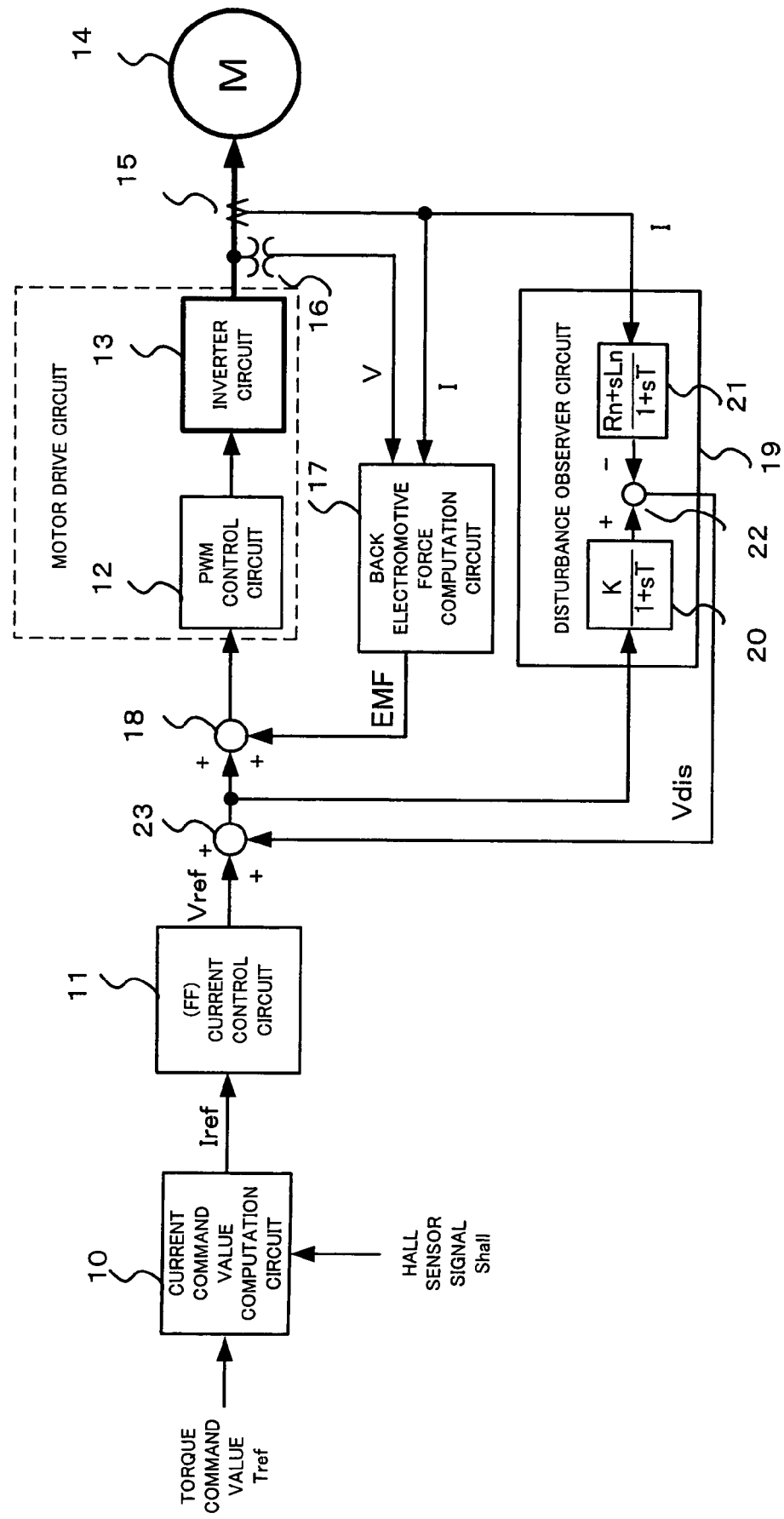
FIG. 3 is a control block diagram illustrating an electric power steering apparatus in which a second aspect of the invention is applied to a feed forward control.

Next, an embodiment of FF control regarding to a second aspect of the invention will be described with reference to FIG. 3.

The second aspect of the invention relates to a control circuit configuration in which the nonlinear elements such as (ii) and (iii) that cannot be estimated beforehand are also compensated to further linearize the motor for more reduced control error. More specifically, the nonlinear elements other than the back electromotive force EMF are extracted by the observer circuit and compensated as similar to the back electromotive force compensation to further linearize the motor.

In order to fully hold the linearized model expressed by the Equation (6), an embodiment of FF control will be described with reference to FIG. 3, which also incorporates compensation of the remaining conditions (ii) and (iii) in addition to the back electromotive force EMF. More specifically, a disturbance observer circuit 19 is added in order to compensate (ii) and (iii). It monitors whether the motor current I being the output of the inverter circuit 13 is correctly outputted with respect to the input of a second voltage command value.

The output of a second adding circuit 23 and the motor current I are inputted to the disturbance observer circuit 19. In the disturbance observer circuit 19, basically, the difference between the output of the second adding circuit 23 and the motor current I is calculated, but the difference between the value obtained by passing the output of the second adding circuit 23 through the LPF circuit 20 and the value obtained by passing the motor current I through the LPF circuit 21 is calculated in a subtraction circuit 22 as the disturbance value $V_{dis}$. To pass through the LPF circuit is done to remove noise contained in the motor current I etc. being the detected value.

The disturbance value $V_{dis}$ being the output of the disturbance observer circuit 19 is fed back to a first voltage command value $V_{ref}$ being the output of a current control circuit 11, and added thereto by the second adding circuit 23. The back electromotive force EMF is further added thereto by an adding circuit 18 to compute a new second voltage command value ($V_{ref}$+$V_{dis}$+EMF) and input it to a PWM control circuit 12. By compensating the disturbance value $V_{dis}$ control errors generated by the factors (ii) and (iii) can be compensated. Since error due to (ii) and (iii) is considerably smaller than error generated by the back electromotive force, it can be compensated by the disturbance observer sufficiently. The invention solves the disadvantage of conventional control by conducting back electromotive force compensation separately from the disturbance observer circuit, the disadvantage is that it is attempted to compensate even the back electromotive force EMF only with the disturbance observer circuit but it fails.

Therefore, nonlinear error such as modeling error of the motor, detection error, and analog-digital conversion error can be compensated by the disturbance observer according to the second aspect of the invention, and the back electromotive force can be compensated by the first aspect of the invention. Thus, in combination of the first and second aspects of the invention, which are features of the invention, control error caused by the nonlinear elements can be fully compensated. This effect exerts an advantage in electric power steering apparatus that an electric power steering apparatus with small motor torque ripple, no abnormal vibrations in steering, and an excellent steering feeling can be realized.

Subsequently, the invention has the effect to compensate the nonlinear element beforehand to linearize the motor for reduced control error, and thus the invention exerts the same advantage when applied to FF control as well as FB control.

Figure 4:
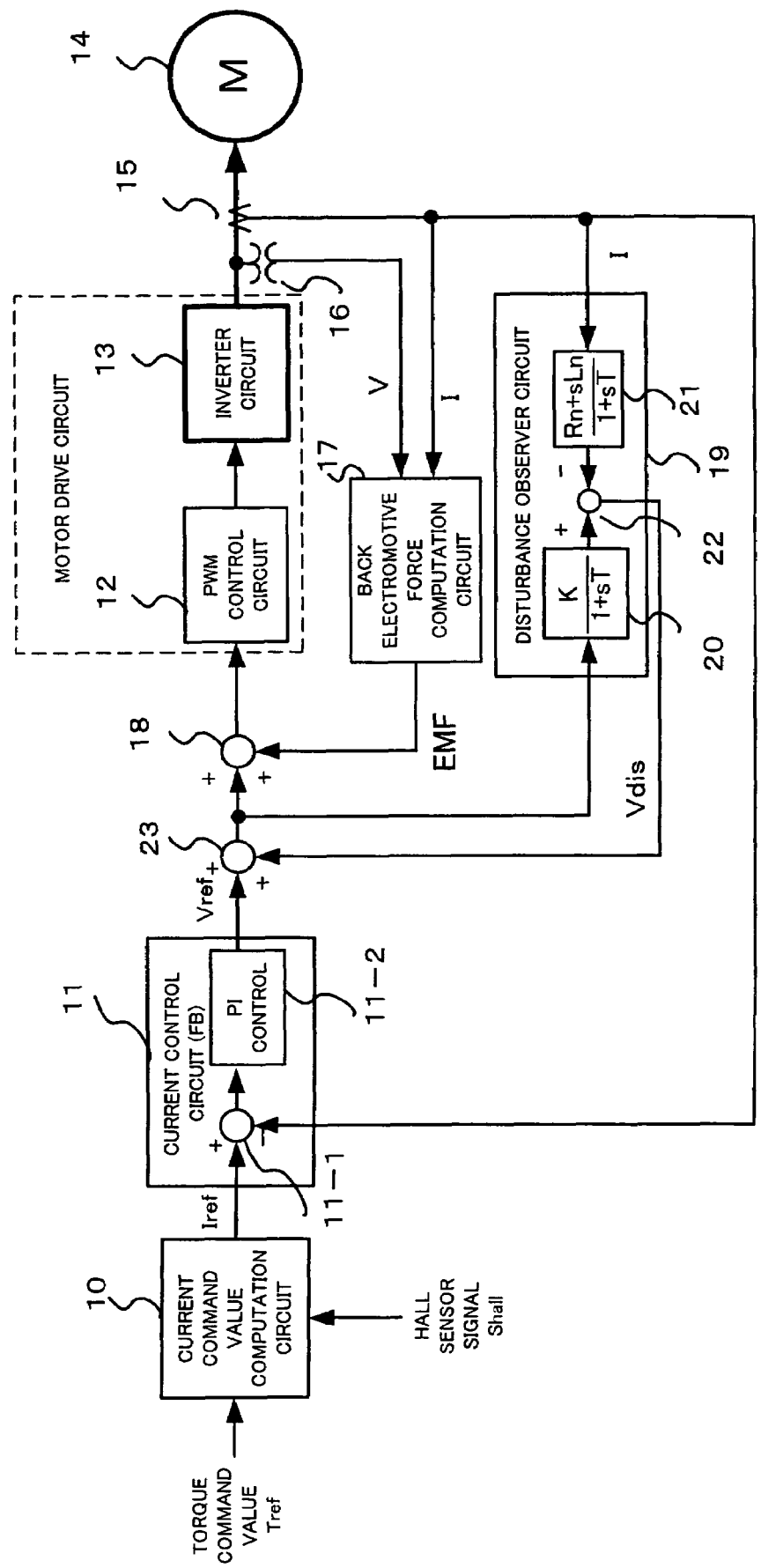
FIG. 4 is a control block diagram illustrating an electric power steering apparatus in which the first and second aspects of the invention are applied to a feedback control.

Hereinafter, an embodiment that the first and second aspects of the invention are applied to FB control will be described with reference to FIG. 4.

The point different from the configuration of FF control shown in FIG. 3 in the configuration of FB control will be described below. The difference is the input of the current control circuit 11 and the processing thereof. More specifically, the input of the current control circuit 11 is the motor current I detected and fed back by a current detection circuit 15 and the current command value $I_{ref}$ computed by a current command value computation circuit 10. The current control circuit 11 is configured so that the motor current I and the current command value $I_{ref}$ are inputted thereto, the difference thereof is computed by a subtraction circuit 11-1, the difference is inputted to a proportional integral circuit 11-2, and the voltage command value $V_{ref}$ is outputted.

The operation of FB control having the configuration shown in FIG. 4 will be described below.

The steering torque command value $T_{ref}$ is inputted to the current command value computation circuit 10 to compute the current command value $I_{ref}$, the motor current I detected by the current detection circuit 15 and the current command value $I_{ref}$ are inputted to the current control circuit 11. In the current control circuit 11, the difference between the current command value $I_{ref}$ and the motor current I is computed by a subtraction circuit 11-1, the difference is inputted to the proportional integral circuit 11-2, and the voltage command value $V_{ref}$ is computed as output.

Conventionally, since the voltage command value $V_{ref}$ is directly inputted to the PWM control circuit 12 in the motor drive circuit, the back electromotive force EMF being the nonlinear element is also controlled as mixed with (R+s·L)·I of the linear element. Thus, control error is large, and control is unstable.

However, in the invention, the disturbance value $V_{dis}$ being the other nonlinear element that is computed by a disturbance observer circuit 19 is added by the second adding circuit 23, and a new voltage command value $V'_{ref}$ (=$V_{ref}$+$V_{dis}$) is computed to compensate the disturbance value $V_{dis}$. Furthermore, the back electromotive force EMF being the nonlinear element that is computed by a back electromotive force computation circuit 17 is added beforehand to the $V'_{ref}$ by an adding circuit 18 before the input of the motor drive circuit for compensation, and a new second voltage command value ($V_{ref}$+$V_{dis}$+EMF) is computed. Therefore, also in FB control to which the invention is applied, the motor model is linearized to satisfy the conditions (i), (ii) and (iii) described above. For control over the motor 14 of the electric power steering apparatus, a control apparatus with less control error and stable control can be obtained.

Accordingly, also in the electric power steering apparatus using FB control to which the invention is applied, an advantage can be expected that an electric power steering apparatus with small motor torque ripple, no abnormal vibrations in steering, and an excellent steering feeling can be achieved.

In the description above, the embodiment has been described in which the LPF circuit of a first order lag circuit is used in the disturbance observer circuit 19 and the back electromotive force computation circuit 17, but it is not limited to the first order lag function. Furthermore, the motor drive circuit is not limited to PWM control, but the same effects can be exerted in PAM control, chopper control, rectangular wave control, etc.

Next, a third aspect of the invention having been made to achieve the second object of the invention is a system in which the back electromotive force computed based on the voltage and current of the motor is used to temporarily compute a rotational speed $\omega$ and an electrical angle $\theta$ of the motor, the electrical angle $\theta$ is added with a lag $\Delta\theta$ computed based on the rotational speed $\omega$, the back electromotive force is again computed by the electrical angle $(\theta+\Delta\theta)$ with no lag, and the back electromotive force with no lag is used in compensation for control.

A fourth aspect of the invention having been made to achieve the second object of the invention is a method in which the detected back electromotive force with a lag is partially simulated not to have a lag so that the back electromotive force with a lag computed based on the motor voltage and current is multiplied by a predetermined gain to obtain the most effective result for control that reduces torque ripples caused by back electromotive force compensation. The principles will be described in detail later with reference to FIG. 11. In the fourth aspect of the invention, it is not correct back electromotive force compensation with no lag in the entire area of the back electromotive force as the third aspect of the invention and the advantage is slightly reduced as torque ripple control. However, it has another advantage that is not provided by the third aspect of the invention that only gain adjustment allows high speed control processing with less arithmetic processing.

Figure 6:
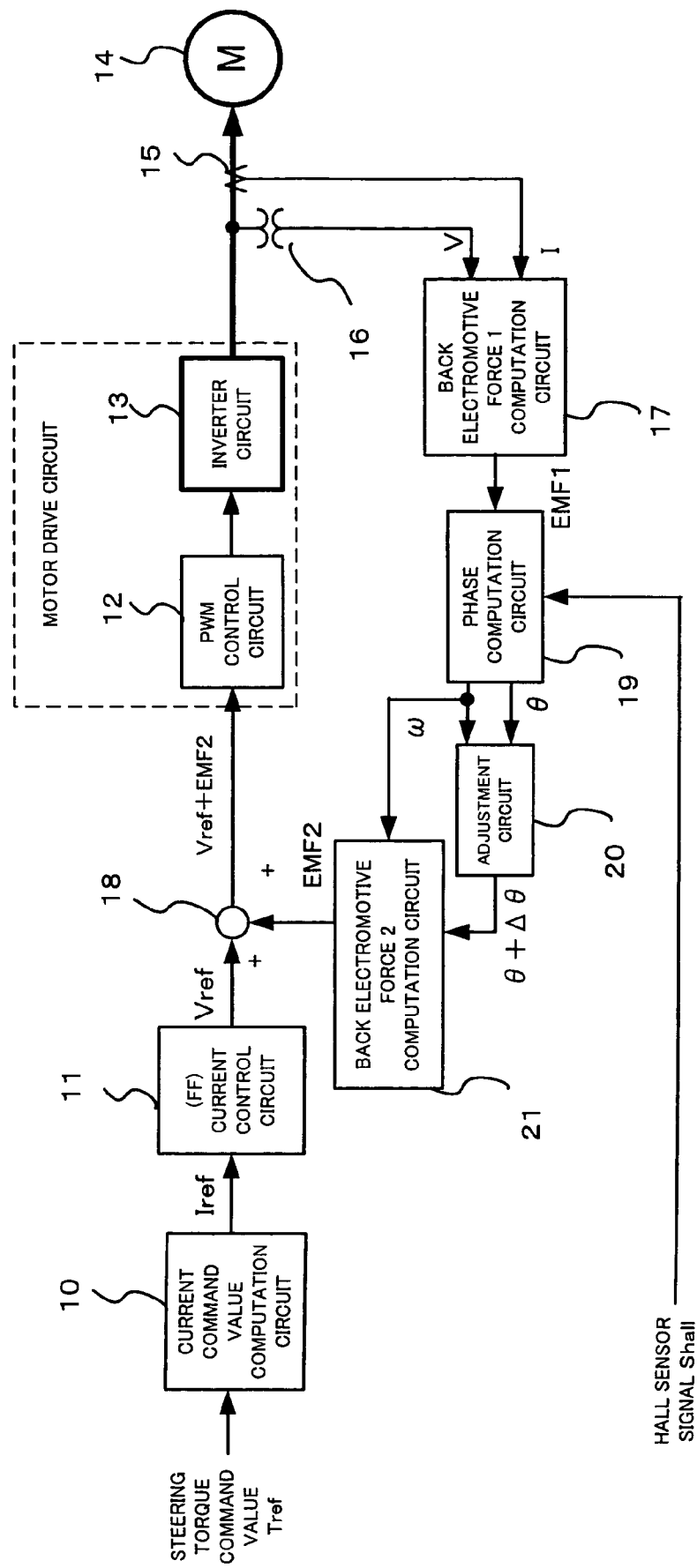
FIG. 6 is a control block diagram illustrating a control apparatus using a feed forward control with a back electromotive force whose lag is compensated, as a third aspect of the invention.

An embodiment of the third aspect of the invention will be described with reference to FIGS. 6, 7 and 8. In FIG. 6, in the basic control except back electromotive force compensation of a motor 14, the current command value $I_{ref}$ is computed by a current command value circuit 10 based on the steering torque command value $T_{ref}$. To the command value $I_{ref}$ there are two cases: the first case is the motor current feedback control (hereinafter, it is denoted as FB control), and the second case is feed forward control (hereinafter, it is denoted as FF control). However, in the embodiment, an example that it is applied to FF control will be described, but it is not limited to FF control in implementing the invention. A current control circuit 11 computes the command value $V_{ref}$ based on the command value $I_{ref}$. In the current control circuit 11, the following is implemented:

$$V_{ref}=(R+s\cdot L)\cdot I_{ref} \quad (8)$$

Next, in an adding circuit 18, the command value $V_{ref}$ is added with a back electromotive force EMF2 which has been subjected to a lag compensation, which will be described later. A PWM control circuit 12 controls an inverter circuit 13 based on the added value ($V_{ref}$+EMF2), and the motor 14 is drive controlled by the output current of the inverter circuit 13.

Here, what is important is that suppose the back electromotive force EMF2 previously referred is accurately computed as back electromotive force with no lag with respect to the actual back electromotive force of the motor 14, torque control can be also done for motor torque control with less ripple. Therefore, it is important how accurately the back electromotive force EMF2 can be computed.

A computation scheme of the back electromotive force EMF2 with no lag will be described below. First, the motor voltage V and the motor current I are detected by a voltage detection circuit 16 and a current detection circuit 15. The motor voltage V and the current I are made as input, and a back electromotive force EMF1 is computed by a first back electromotive force computation circuit. In the computation scheme, the current I is inputted to a transfer function 17-1 in a back electromotive force 1 computation circuit 17 shown in FIG. 7 based on Equation (1), the output of the transfer function 17-1 is subtracted from the voltage V in a subtraction circuit 17-2, and then the back electromotive force EMF1 is computed. In addition, the back electromotive force 1 computation circuit 17 corresponds to the first back electromotive force computation circuit. As described before, the transfer function 17-1 has the first order lag function, causing a lag. Furthermore, in digital control, since the voltage V and the current I detected by the voltage detection circuit 16 and the current detection circuit 15 are analog quantity, a lag is generated when converted to digital values. A filter in hardware before A/D conversion is a cause of a lag in the back electromotive force EMF1.

Subsequently, the angular velocity $\omega$ and the electrical angle $\theta$ of the motor 14 are computed by a phase computation circuit 19 based on the back electromotive force EMF1. The back electromotive force and the angular velocity have a relationship expressed by Equation (9):

$$\omega=EMF/Ke \quad (9)$$

where, Ke is a motor back electromotive force constant (V/rpm).

Therefore, the back electromotive force EMF1 computed by the back electromotive force 1 computation circuit 17 is inputted to an angular velocity computation circuit 19-1 to compute the angular velocity $\omega$ in accordance with the relationship expressed by Equation (9).

Next, for the computation scheme of the electrical angle $\theta$, there is an integral relationship between the angular velocity $\omega$ and the electrical angle $\theta$ expressed by the following Equation (10):

$$\theta=\theta_0+\int \omega \cdot dt \quad (10)$$

In addition, when the motor is attached with a simple rotational position sensor such as a Hall sensor, the value of the electrical angle can be sensed in a discrete manner. For example, in the example of the embodiment, the detected value of the electrical angle $\theta_0$ (=0, 60, 120, 180, 240, and 300 degrees) can be detected from the Hall sensor at every 60 degrees, and thus, for example, the value of the electrical angle from 0 degree to 60 degrees or from 60 to 120 degrees are computed by integration by Equation (10). Accordingly, for the electrical angle $\theta$, the angular velocity $\omega$ computed by the angular velocity computation circuit 19-1 is inputted to an electrical angle computation circuit 19-2 to compute the electrical angle $\theta$ in accordance with Equation (10).

Next, compensation of the phase lag $\Delta\theta$ of the electrical angle $\theta$, which is most important in the third aspect of the invention will be described with reference to FIG. 8. The lag of the electrical angle is influenced by the angular velocity $\omega$. The lag becomes greater as the angular velocity $\omega$ is faster. Therefore, in the embodiment, lag compensation is compensated by the relationship expressed by Equation (11).

$$\Delta\theta=[(\Delta\theta 2-\Delta\theta 1)\cdot(\omega-\omega 1)/(\omega 2-\omega 1)]+\Delta\theta 1 \quad (11)$$

where, the equation is held in $\omega 1<\omega<\omega 2$.

In addition, $\Delta\theta=\Delta\theta 1$, where $\omega<\omega 1$, and $\Delta\theta=\Delta\theta 2$, where $\omega 2<\omega$.

The relationship between Δθ and ω in Equation (11) is measured by experiments using actual devices, that is, an actual motor and an ECU.

The angular velocity ω and the electrical angle θ with a lag computed by the phase computation circuit 19 are inputted to an adjustment circuit 20. The angular velocity ω is first inputted to a phase lag computation circuit 20-1 to compute the phase lag Δθ. Then, an adding circuit 20-2 adds the phase lag Δθ of lag compensation computed by the phase lag computation circuit 20-1 to the electrical angle θ with a lag computed by the phase computation circuit 19, and the adjusted electrical angle (θ+Δθ) is computed. The adjusted electrical angle (θ+Δθ) expresses an accurate electrical angle with no lag.

Subsequently, based on the accurate adjusted electrical angle (θ+Δθ), the back electromotive force is again computed. For the scheme, a back electromotive force 2 computation circuit 21 which is a second back electromotive force computation circuit is used for computation. The back electromotive force 2 computation circuit 21 is formed of a normalized back electromotive force computation circuit 21-1 and a revolution correction circuit 21-2. In the normalized back electromotive force computation circuit 21-1, the back electromotive force $EMF_{1000}$ of the motor rotating at 1000 rpm is computed based on the adjusted electrical angle (θ+Δθ). In the revolution correction circuit 21-2, the back electromotive force can be expressed as Equation (12) because it is proportional to revolutions. For example, when the motor rotates at 1100 rpm, the value computed by the normalized back electromotive force computation circuit 21-1 should be multiplied by 1.1.

$$EMF2=(\omega/1000) \cdot EMF_{1000} \quad (12)$$

Here, the normalized back electromotive force computation circuit 21-1 will be described. The back electromotive force waveforms generated by the electrical angle θ are varied depending on the types of motors or design values. For example, for a sinusoidal motor, the back electromotive force waveform is sinusoidal, and for a rectangular wave motor, it is trapezoidal. Furthermore, in order to reduce cogging torque of the motor, design is devised in such a way that a flat portion of a trapezoidal wave is widened as much as possible. Thus, the normalized back electromotive force computation circuit 21-1 uses an actual designed motor to determine the back electromotive force $EMF_{1000}$ at 1000 rpm by actual measurement. Then, the adjusted electrical angle (θ+Δθ) with no lag and the angular velocity w computed by the adjustment circuit 20 are inputted to the back electromotive force 2 computation circuit 21, and then an accurate back electromotive force EMF2 is computed.

The computed accurate back electromotive force EMF2 is added to the command value $V_{ref}$ outputted from the current control circuit 11 in the adding circuit 18 in FIG. 6, to be a new command value ($V_{ref}$+EMF2). It is inputted to the PWM control circuit 12, and the inverter circuit 13 is controlled based on the command of the PWM control circuit 12. Since the new command value ($V_{ref}$+EMF2) is compensated with the back electromotive force EMF2 with no lag, the motor 14 can be controlled with small torque ripple. Again emphasized is that the torque control small torque ripple can be achieved because the back electromotive force is compensated in the current control loop by accurate back electromotive force with no lag.

Figure 7:
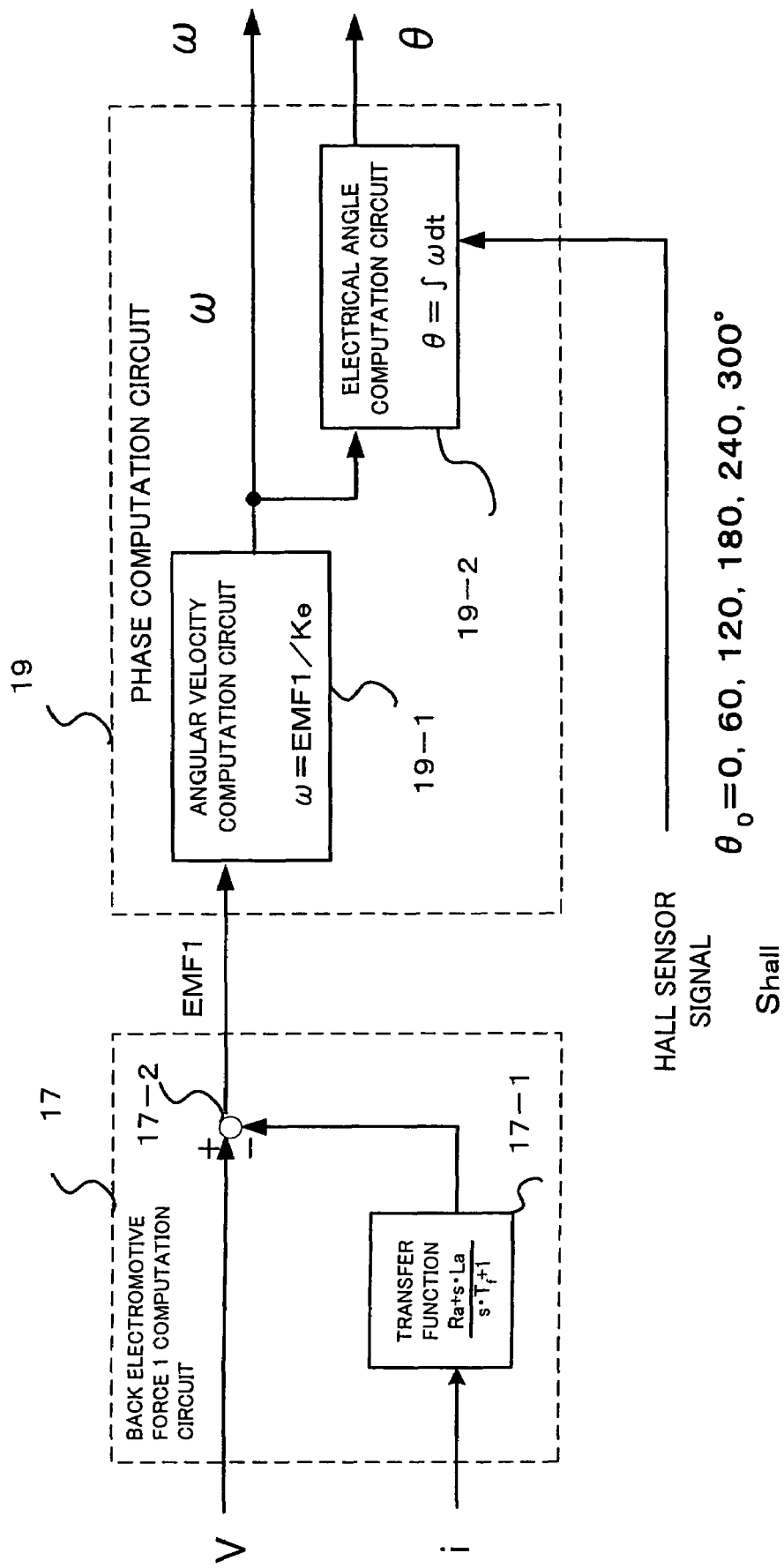
FIG. 7 is a block diagram illustrating the detail of a first back electromotive force computation circuit and a phase computation circuit.
Figure 8:
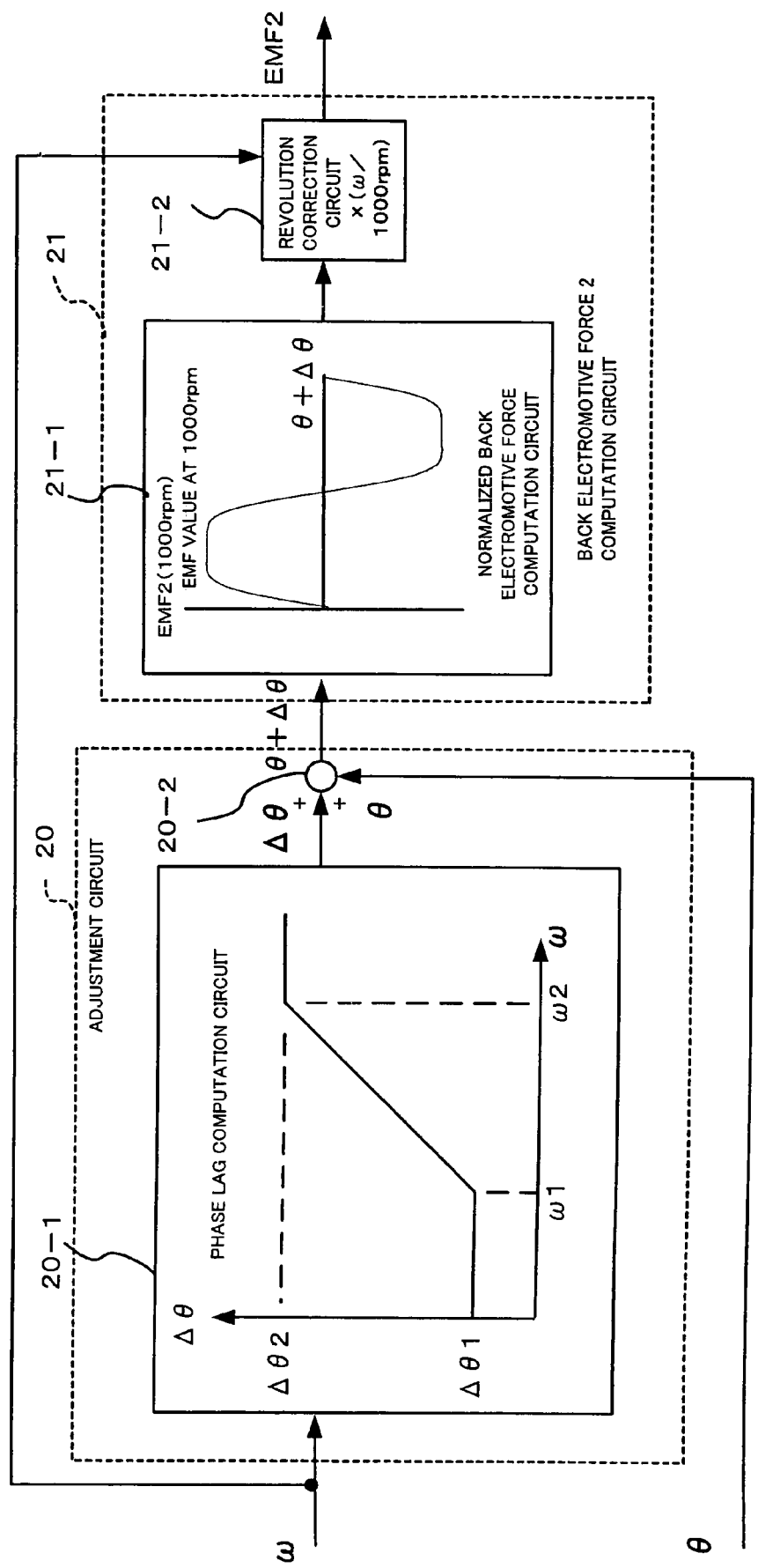
FIG. 8 is a block diagram illustrating the detail of an adjustment circuit which compensates a phase lag and a second back electromotive force computation circuit.
Figure 9:
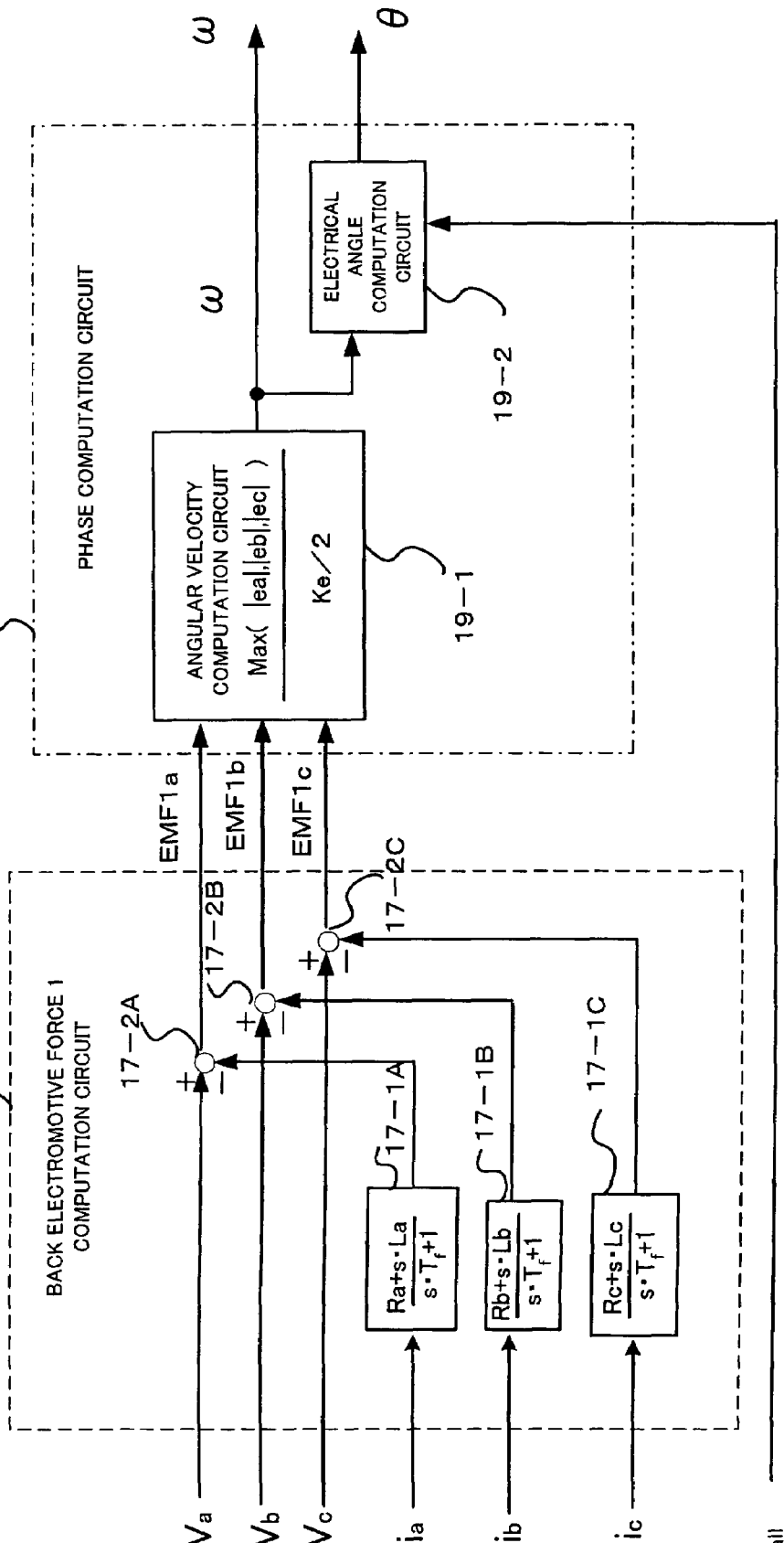
FIG. 9 is a block diagram illustrating a computing section of the back electromotive force, targeting a three-phase motor.

Although, in FIG. 7, that the first back electromotive force computation circuit, and the control block diagram in which the angular velocity, and the electrical angle are determined is represented in a single-line diagram, in a three phase brushless DC motor, for example, it is possible to compute more refined back electromotive force based on the detected values of three-phase voltage and current as shown in FIG. 9.

Furthermore, even for another type of motor such as a sinusoidal motor and a rectangular wave motor, not a brushless DC motor, the principles of the invention can be applied to expect the advantage that torque ripples are reduced.

Moreover, in the description above, the example is taken for explanation that the first back electromotive force computation circuit and the second back electromotive force computation circuit are applied to the brushless DC motor. In the case of different types of motors, the same advantage can be obtained when the back electromotive force computation equation matched with that motor is used.

Figure 10:
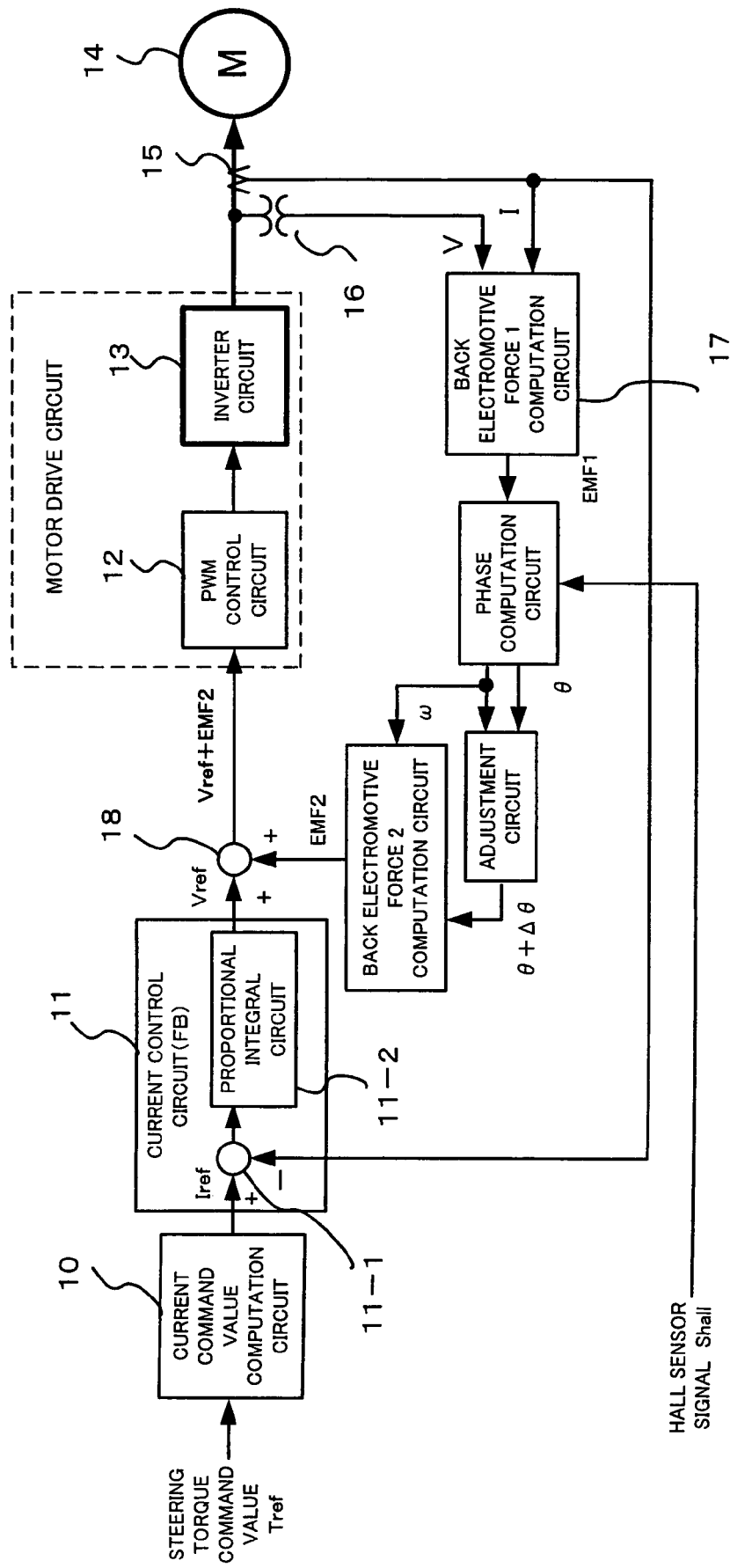
FIG. 10 is a control block diagram illustrating a control apparatus using a feedback control with the back electromotive force whose lag is compensated, as the third aspect of the invention.

Besides, in FIG. 6, the example is taken for explanation that the current control circuit 11 is for FF control. Even in the case of FB control as shown in FIG. 10, the back electromotive force compensation exerts an advantage. In FIG. 10, the current control circuit 11 takes an FB control method in which a subtraction circuit 11-1 calculates a difference between the motor current I detected by a current detection circuit 15 and the command value $I_{ref}$ computed by the current command value computation circuit 10 and the difference is inputted to the proportional integral circuit 11-2 to compute the command value $V_{ref}$.

Next, the fourth aspect of the invention will be described. The back electromotive force EMF1 computed by the back electromotive force 1 computation circuit 17 has a lag with respect to the actual motor back electromotive force. What affect the lag has with respect to the torque output is that output is always generated less than a required amount when torque output rises or drops. Then, the back electromotive force EMF1 with a lag is multiplied by gain to compensate the output shortage of torque due to the lag, and then the output shortage can be compensated in some range where the back electromotive force is varied.

More specifically, even though the back electromotive force with a lag is multiplied by a predetermined gain, the entire area of the back electromotive force cannot be the back electromotive force with no lag, but only a portion of the back electromotive force in which the lag is difficult to be compensated by the control of the current control circuit etc. can be converted to the back electromotive force with no lag.

Figure 11:
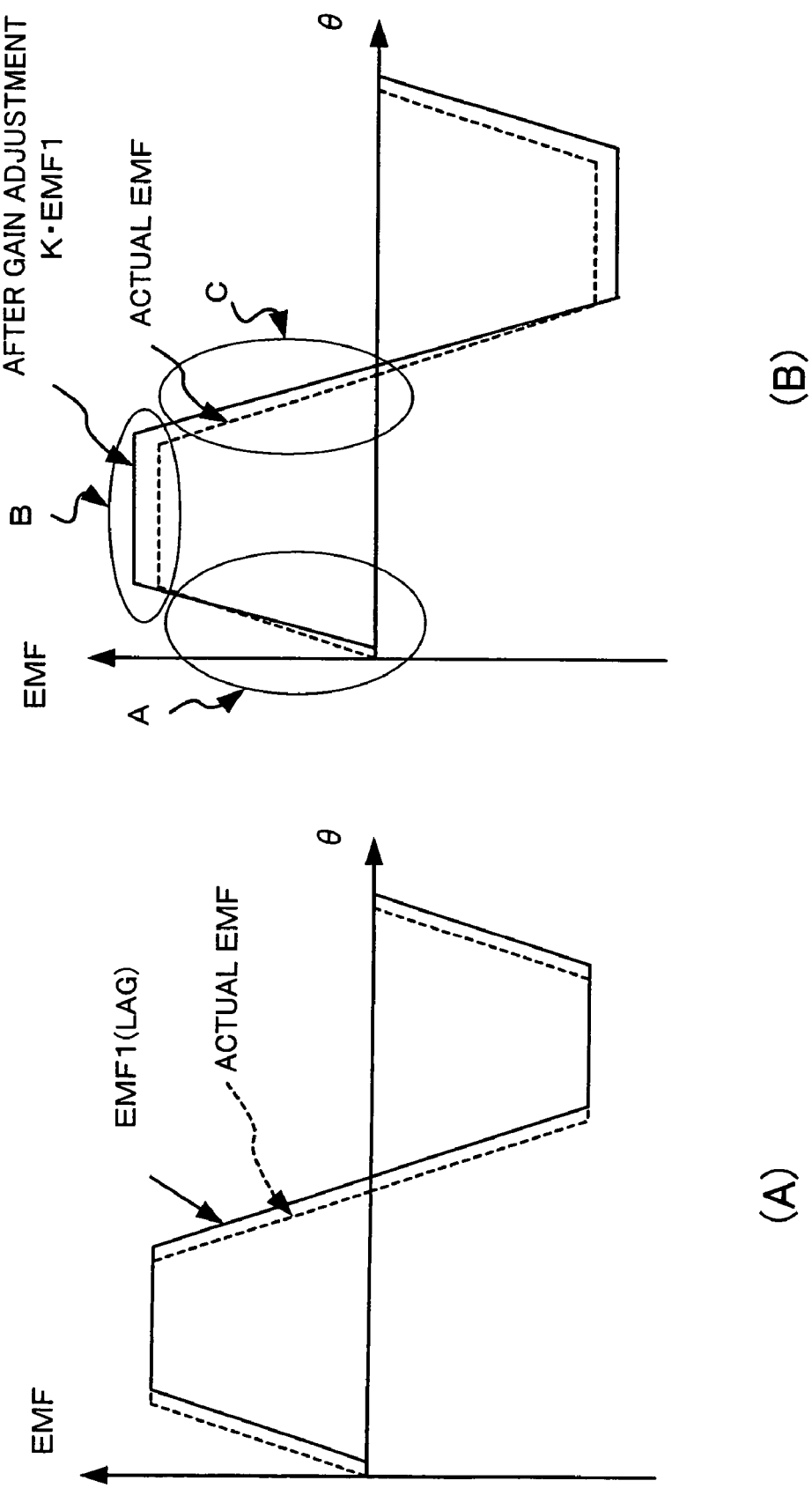
FIG. 11 is diagrams illustrative of the principle of lag compensation in computing the back electromotive force by gain adjustment as a fourth aspect of the invention.

For easy understanding of this system, it will be described with reference to FIG. 11. FIG. 11(A) depicts the relationship between the back electromotive force EMF1 with a lag computed by the back electromotive force 1 computation circuit 17 and the actual back electromotive force. Then, FIG. 11(B) depicts the relationship between the actual back electromotive force and the back electromotive force K·EMF with gain adjustment.

In FIG. 11(B), a portion surrounded by ellipse A is the portion in which it is difficult to reduce torque ripples by the current control circuit etc. A portion surrounded by ellipse B is the portion in which the lag of EMF can be compensated by the current control circuit as error and disturbance. A portion surrounded by ellipse C is also the portion in which compensation by the current control circuit is possible. Thus, when a gain is multiplied, it is important to multiply the gain so that the actual back electromotive force is overlapped with the back electromotive force K·EMF1 multiplied by the gain in the portion surrounded by ellipse A.

Figure 12:
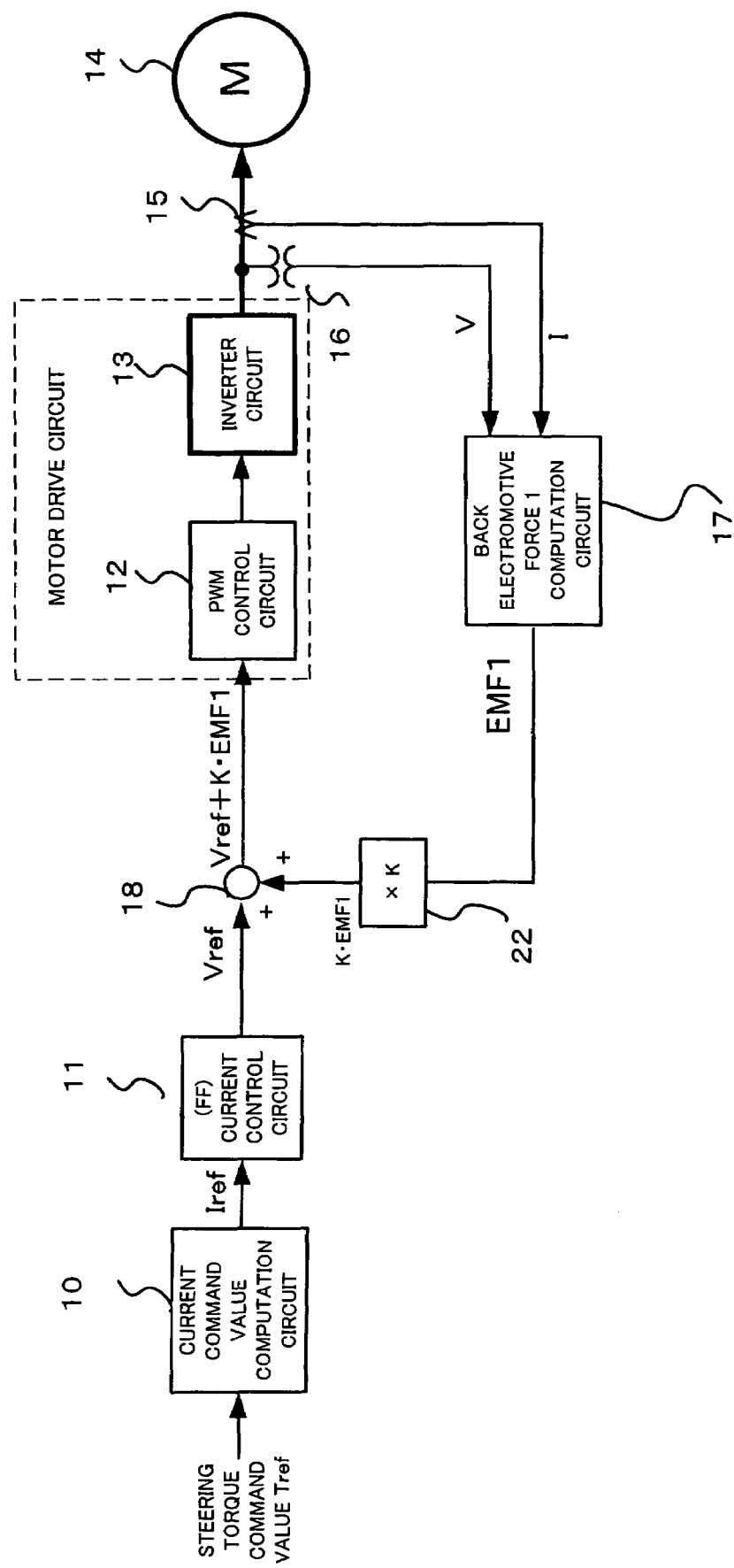
FIG. 12 is a block diagram illustrating lag compensation in computing the back electromotive force by gain adjustment as the fourth aspect of the invention.

An embodiment of the fourth aspect of the invention based on this idea will be described with reference to FIG. 12. In FIG. 12, for gain K, K=1.2, for example. Therefore, the back electromotive force EMF1 outputted by a back electromotive force 1 computation circuit 17 is multiplied by 1.2 by a multiplication circuit 22, added to the command value $V_{ref}$ by an adding circuit 18. It is inputted to a PWM control circuit 12 as a new command value ($V_{ref}$+K·EMF1), and an inverter circuit 13 controls a motor 14 by the control of the PWM control circuit.

When the command value of the PWM control circuit 12 is ($V_{ref}$+EMF1), compensation by the back electromotive force is short due to a lag. Thus, torque ripple is large, and the torque output is rather small. However, when the command value is compensated to ($V_{ref}$+K·EMF1), it becomes close to compensation by the accurate back electromotive force EMF2 with no lag so that torque ripple become small, and the torque output can be outputted large.

In the fourth aspect of the invention, since it is not required of complicated processing as in the third aspect of the invention, it can obtain advantages that processing speed is fast, the circuit can be simplified, and the capacity of ROM etc. can be small, which are not provided by the third aspect of the invention.

Figure 13:
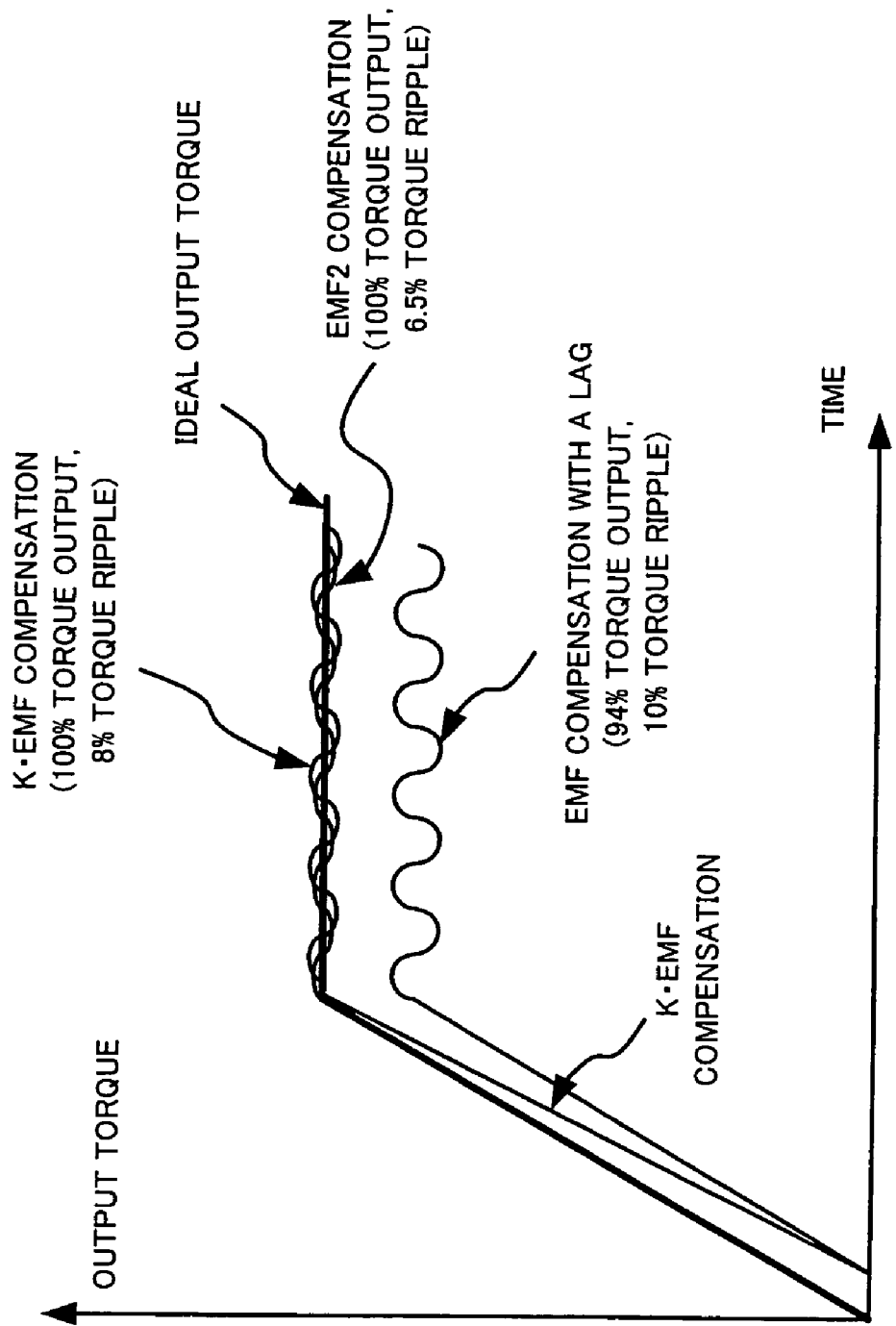
FIG. 13 is a diagram illustrating effects of the third and fourth aspects of the invention by simulation.
Figure 14:
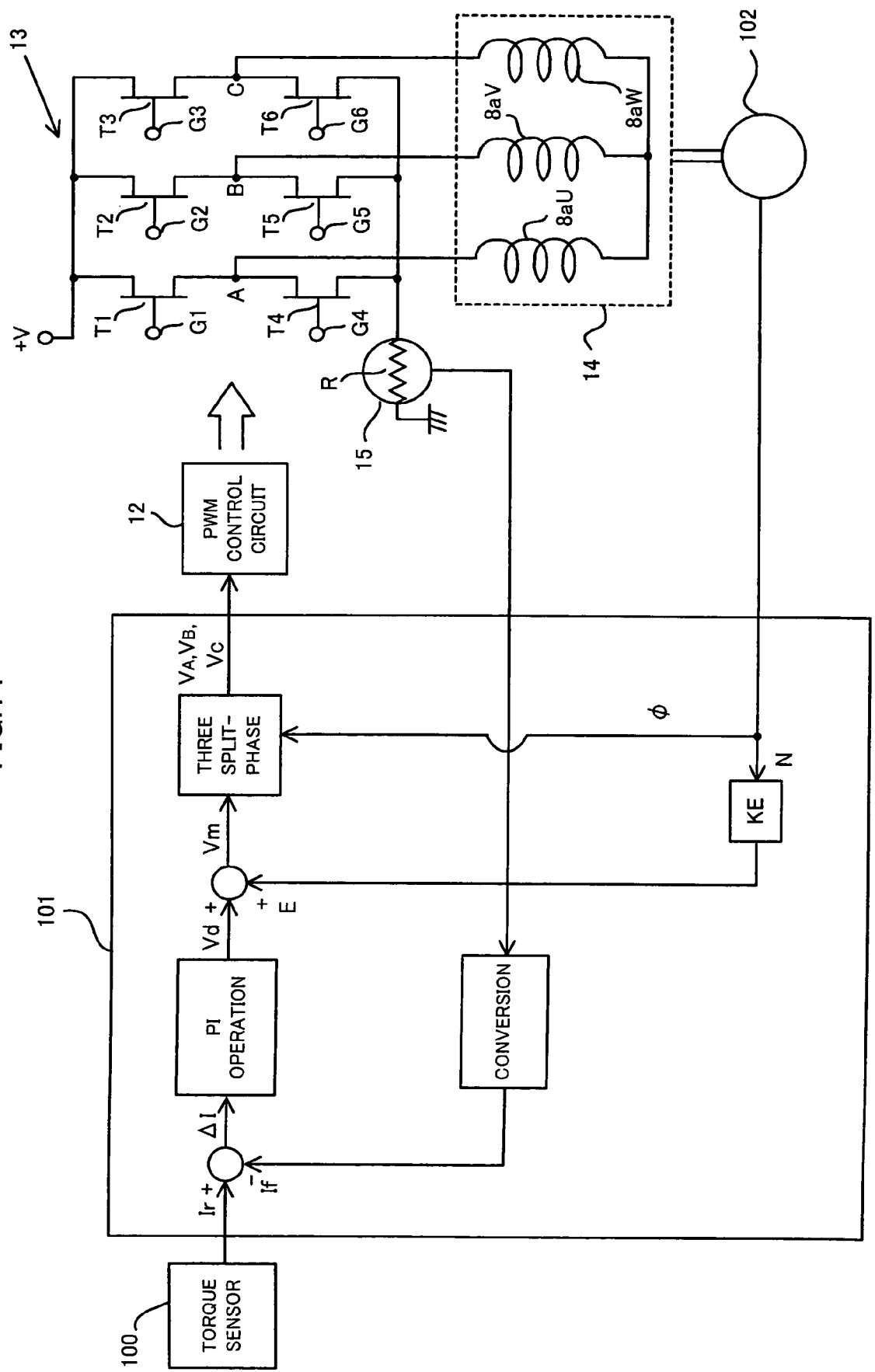
FIG. 14 is a control block diagram illustrating a conventional control apparatus by back electromotive force compensation using a conventional rotational speed sensor with no lag compensation.

The advantages of the third and the fourth aspects of the invention will be described with reference to FIG. 13. According to a simulation for a brushless DC motor, supposing that a desirable torque output is 100%, and a torque ripple is 0%, when the back electromotive force added by the adding circuit 18 is only EMF1 with a lag, the torque output is 94%, and the torque ripple is 10%. On the other hand, when the back electromotive force added by the adding circuit 18 is K·EMF1, improvement is observed that the torque output is 100%, and the torque ripple is to 8%. Furthermore, when the back electromotive force added by the adding circuit 18 is EMF2 with no lag, the best effect can be obtained that the torque output is 100%, and the torque ripple is 6.5%.

As described above, according to the control apparatus of the electric power steering apparatus of the first and second aspects of the invention, by compensating the nonlinear element of the motor model of the electric power steering apparatus beforehand to linearize the motor model it is possible to provide the control apparatus of the electric power steering apparatus with less control error, stable controllability, small motor output torque ripple, and good wheel steering feeling.

In addition to this, since the motor back electromotive force to compensate the nonlinear element can be determined based on the motor output voltage and output current, an expensive rotational speed sensor is not required to determine the angular velocity as in the conventional example, and it can be advantageously implemented by a simple configuration.

Furthermore, according to the control apparatus of the electric power steering apparatus of the third and the fourth aspects of the invention, the back electromotive force with no lag is computed and the back electromotive force is compensated in the control loop. Thus, there is the advantage that the control apparatus of the electric power steering apparatus with small output torque ripple of the motor, smooth steering, and less noise is provided.

The invention claimed is:

1. A control apparatus of an electric power steering apparatus in which steering auxiliary power by a motor is given to a steering system of a vehicle, the control apparatus is comprising:
    a motor drive circuit which drives said motor;
    a current control circuit (11) which computes a first voltage command value that is a control command to said motor drive circuit;
    a back electromotive force computation circuit (17) which computes a back electromotive force of said motor based on the output voltage and output current of said motor drive circuit; and
    an adding circuit (18) which adds said back electromotive force to said first voltage command value to compute a second voltage command value that is a new control command to said motor drive circuit.

2. The control apparatus of an electric power steering apparatus according to claim 1, characterized in that:
    a second adding circuit (23) is disposed between said current control circuit (11) and said adding circuit (18);
    the output of said current control circuit (11) is inputted to said second adding circuit (23), and the output of said second adding circuit (23) is inputted to said adding circuit (18);
    a disturbance observer circuit (19) is disposed to which the outputs of said second adding circuit (23) and said motor drive circuit are inputted; and
    a disturbance value that is the output of said disturbance observer circuit (19) is inputted to said second adding circuit (23), added to said first voltage command value, and inputted to said adding circuit (18).

3. The control apparatus of an electric power steering apparatus according to claim 2, characterized in that:
    said disturbance value is a difference between a value that is obtained by multiplying an input value of said adding circuit (18) by a transfer function and a value that is obtained by multiplying an output value of said motor drive circuit by the transfer function.

4. The control apparatus of an electric power steering apparatus according to claim 3, characterized in that:
    said current control circuit (11) is a feed forward control or feedback control.

5. The control apparatus of an electric power steering apparatus according to claim 2, characterized in that:
    said current control circuit (11) is a feed forward control or feedback control.

6. The control apparatus of an electric power steering apparatus according to claims 1, characterized in that:
    said current control circuit (11) is a feed forward control or feedback control.

7. A control apparatus of an electric power steering apparatus in which steering auxiliary power by a motor is given to a steering system of a vehicle, the control apparatus is comprising:
    a motor drive circuit which drives said motor;
    a first back electromotive force computation circuit which computes back electromotive force (EMF1) of said motor based on the output voltage and output current of said motor drive circuit;
    a phase computation circuit which computes an electrical angle ($\theta$) and an angular velocity ($\omega$) based on said back electromotive force (EMF1);
    an adjustment circuit which computes an adjusted electrical angle ($\theta$+$\Delta\theta$) which is compensated for a phase lag ($\Delta\theta$) based on said angular velocity ($\omega$); and
    a second back electromotive force computation circuit which computes adjusted back electromotive force (EMF2) based on said adjusted the electrical angle ($\theta$+$\Delta\theta$).

8. The control apparatus of an electric power steering apparatus according to claim 7, characterized in that:
    a current control circuit is provided which computes a command value ($V_{ref}$) to control said motor based on a steering torque command value ($T_{ref}$) to said motor,
    wherein said motor is controlled based on a command value ($V_{ref}$+EMF2) which is obtained by adding said adjusted back electromotive force (EMF2) to said command value ($V_{ref}$).

9. The control apparatus of an electric power steering apparatus according to claim 8, characterized in that:
said current control circuit is a feed forward control circuit or a feedback control circuit.

10. A control apparatus of an electric power steering apparatus in which steering auxiliary power by a motor is given to a steering system of a vehicle, the control apparatus is comprising:
a current control circuit which computes a command value ($V_{ref}$) to control said motor based on a steering torque command value ($T_{ref}$) to said motor;
a motor drive circuit which drives said motor;
a first back electromotive force computation circuit which computes back electromotive force (EMF1) of said motor based on the output voltage and output current of said motor drive circuit; and
a correction circuit which computes a corrected back electromotive force (K·EMF1) which is obtained by multiplying said back electromotive force (EMF1) by a predetermined value (K),
wherein said motor is drive controlled based on a value ($V_{ref}$+K·EMF1) which is obtained by adding said corrected back electromotive force (K·EMF1) to said command value ($V_{ref}$).

11. The control apparatus of an electric power steering apparatus according to claim 10, characterized in that:
said current control circuit is a feed forward control circuit or a feedback control circuit.

* * * * *